United States Patent
Gipp et al.

(10) Patent No.: US 8,315,992 B1
(45) Date of Patent: Nov. 20, 2012

(54) AFFINITY BASED ALLOCATION FOR STORAGE IMPLEMENTATIONS EMPLOYING DEDUPLICATED DATA STORES

(75) Inventors: Stephan Kurt Gipp, Inver Grove Heights, MN (US); Adonijah Park, Forest Lake, MN (US)

(73) Assignee: Symantec Corporation, Mountain View, CA (US)

( * ) Notice: Subject to any disclaimer, the term of this patent is extended or adjusted under 35 U.S.C. 154(b) by 423 days.

(21) Appl. No.: 12/324,428

(22) Filed: Nov. 26, 2008

(51) Int. Cl.
*G06F 17/30* (2006.01)

(52) U.S. Cl. ........................................ 707/692; 711/162

(58) Field of Classification Search ................... 707/644, 707/692; 711/162
See application file for complete search history.

(56) References Cited

U.S. PATENT DOCUMENTS

| | | | | |
|---|---|---|---|---|
| 5,317,739 A * | 5/1994 | Elko et al. | ..................... | 709/216 |
| 7,672,981 B1 * | 3/2010 | Faibish et al. | .......... | 707/999.204 |
| 7,734,603 B1 * | 6/2010 | McManis | ....................... | 707/696 |
| 7,769,971 B2 * | 8/2010 | Cremelie et al. | .............. | 711/162 |
| 7,827,147 B1 * | 11/2010 | D'Hoye et al. | ............... | 707/652 |
| 7,870,105 B2 * | 1/2011 | Arakawa et al. | .............. | 707/692 |
| 2007/0203872 A1 * | 8/2007 | Flinn et al. | ....................... | 706/62 |
| 2008/0104146 A1 * | 5/2008 | Schwaab et al. | .............. | 707/204 |
| 2008/0243769 A1 * | 10/2008 | Arbour et al. | ..................... | 707/2 |

* cited by examiner

*Primary Examiner* — Jorge A Casanova
(74) *Attorney, Agent, or Firm* — Campbell Stephenson LLP

(57) ABSTRACT

A method, apparatus, and computer program product for implementing affinity based allocation for storage implementations employing deduplicated data stores is disclosed. According to an embodiment of the present invention, a backup manager determines if information associating a data source with a first data target of a plurality of data targets has been established. The first data target is a deduplication data store and the information associating the data source with the first data target indicates an increased likelihood of at least some information stored on the data source is already being stored on the first data target prior to performing a backup. If information associating the data source with the first data target has been established, the backup manager stores a set of data on the data target.

19 Claims, 5 Drawing Sheets

| Client Identifier Field 302 | Backup Policy Field 304 | Backup Schedule Field 306 | Backup Type Field 308 | Data Target Field 310 | Operating System Type Field 312 | Affinity Value Field 314 |
|---|---|---|---|---|---|---|
| Client 1 | Weekly | Day X at XX:XX | Full | Data Target 1 | Windows XP Pro SP3 | 42 |
| Client 2 | Monthly | Day X at XX:XX | Full | Data Target 2 | Mac OSX 10.5.4 | 7 |
| Client 3 | Daily | XX:XX | Incremental | Data Target 1 | Windows Vista | 88 |
| Client 4 | Hourly | Hourly | Incremental | Data Target 6 | Ubuntu 8.10 | 2 |
| Client 5 | Bi-weekly | Every 3 days at XX:XX | Incremental | Data Target 12 | Windows ME | 98 |
| Client 6 | Weekly | Day X at XX:XX | Incremental | Data Target 5 | Windows Server 2003 | 6 |
| . . . | . . . | . . . | . . . | . . . | . . . | . . . |
| Client N | Daily | XX:XX | Incremental | Data Target 7 | Windows NT 3.51 | 78 |

*Fig. 3*

AFFINITY BASED ALLOCATION FOR STORAGE IMPLEMENTATIONS EMPLOYING DEDUPLICATED DATA STORES

BACKGROUND OF THE INVENTION

1. Field of the Invention

The present invention relates generally to data processing systems and, more specifically, to backup systems that employ deduplicated data stores.

2. Description of the Related Art

Many backup systems can support multiple storage volumes (and/or storage devices), which enable a system administrator or other user to easily add additional storage devices to increase storage capacity when necessary. Backup systems implement allocation schemes to effectively allocate data among multiple storage devices. An example of an allocation scheme is a scheme that prioritizes the selection of a storage volume to store backup data based on the available space remaining on a storage volume. If such a scheme is implemented, upon receipt of a request to initiate a backup procedure, the backup system assigns a storage volume with the most available space to store the data associated with the backup procedure.

One system used for storing backup copies generated from primary data is a data deduplication data store or system. A data deduplication system provides a mechanism for storing a piece of information (which can include a file or a block of data) only one time. For example, during a first backup operation, if a set of data to be backed up includes multiple copies of a particular file (or even a particular block of data), only one copy of the particular file (or block of data) will be stored in the data deduplication system. Similarly, if the set of data includes data that has not changed between the time of the first backup operation and a subsequent backup operation, the data that has not changed will not be duplicated in storage as long as a copy of that data continues to be stored in the data deduplication system. The data deduplication system stores data in a manner that effectively provides data compression. Storing only a single copy of data reduces the amount of space a set of data that originally contains multiple copies of the data occupies within the data deduplication system.

With the advent of disk-based storage implementations that utilize data deduplication compression technology, allocation schemes for storing data among multiple storage devices and/or storage volumes that are driven by a metric such as "available space per disk volume" are no longer adequate. For example, a backup server utilizing an "available space per disk volume" allocation scheme would assign the storage device or storage volume (device or volume 1) with the most available space to handle an incoming backup procedure from a particular client. If the particular client has performed a prior backup to the backup server, the data associated with the prior backup could have been stored on a different storage device or volume (device or volume 2). Thus, after the incoming backup procedure completes, much of the data stored on device or volume 1 and device or volume 2 would be duplicate data. Since the very nature of deduplication algorithms focus on storing data only once, the "available space per disk volume" allocation scheme would result in storing data copies on multiple storage devices (e.g., device or volume 1 and device or volume 2, according to the prior example), thus counteracting the benefits of a deduplication system implementation.

The problem of storing duplicate copies of data becomes even more apparent if the choice for the allocation scheme is not only between traditional storage devices and a single deduplication storage device, but rather between multiple deduplication storage devices that are potentially manufactured by different vendors. In such a configuration, backup procedures are likely to alternate between multiple deduplication storage devices in an erratic manner, only to store the same data in all of these deduplication storage devices, which works against the entire principle of only storing one instance of data or blocks of data. Thus, there is a need for an improved method, apparatus, and computer program product for managing a backup system that uses deduplication storage devices or volumes to store backups.

BRIEF DESCRIPTION OF THE DRAWINGS

The present invention may be better understood, and its numerous objects, features and advantages made apparent to those skilled in the art by referencing the accompanying drawings.

FIG. 3 illustrates an example of an affinity database, according to one embodiment of the invention.

DETAILED DESCRIPTION

Introduction

Embodiments of the present invention enable the management of a backup system that user deduplication storage devices or volumes to store backups. According to an embodiment of the present invention, upon receiving a request to start a backup operation from a data source (e.g., a client), a backup manager accesses the affinity database to determine if an affinity relationship exists between the data source and a data target. If an affinity relationship does exist between the data source and a data target, the backup manager assigns the data target to the data source to complete the backup operation. If an affinity relationship does not exist between the data source and a data target, methods such as round-robin, least-recently-used, and/or available-space-per-disk-volume assignments can be used to match the requesting data source with a data target. Then, the requesting data source sends a set of data to the assigned data target to complete the backup operation.

Once the backup operation is complete, if there is no pre-existing affinity relationship between the data source and the data target, the backup manager creates a new entry in the affinity database defining the details of the completed backup operation. The backup manager then populates some or all of the fields in the affinity database to generate the new entry.

Also, once the backup operation is complete, if there is a pre-existing affinity relationship between the data source and the data target (indicated by a matching entry in the affinity database), the backup manager can modify the fields in the existing entry to update the entry with information pertaining to the completed backup operation. According to one embodiment, backup operations do not necessarily have to be initiated by a data source, but can be initiated by the server (via the backup manager or otherwise) or other data sources.

An Example Architecture for Affinity-Based Allocation

Figure 1:
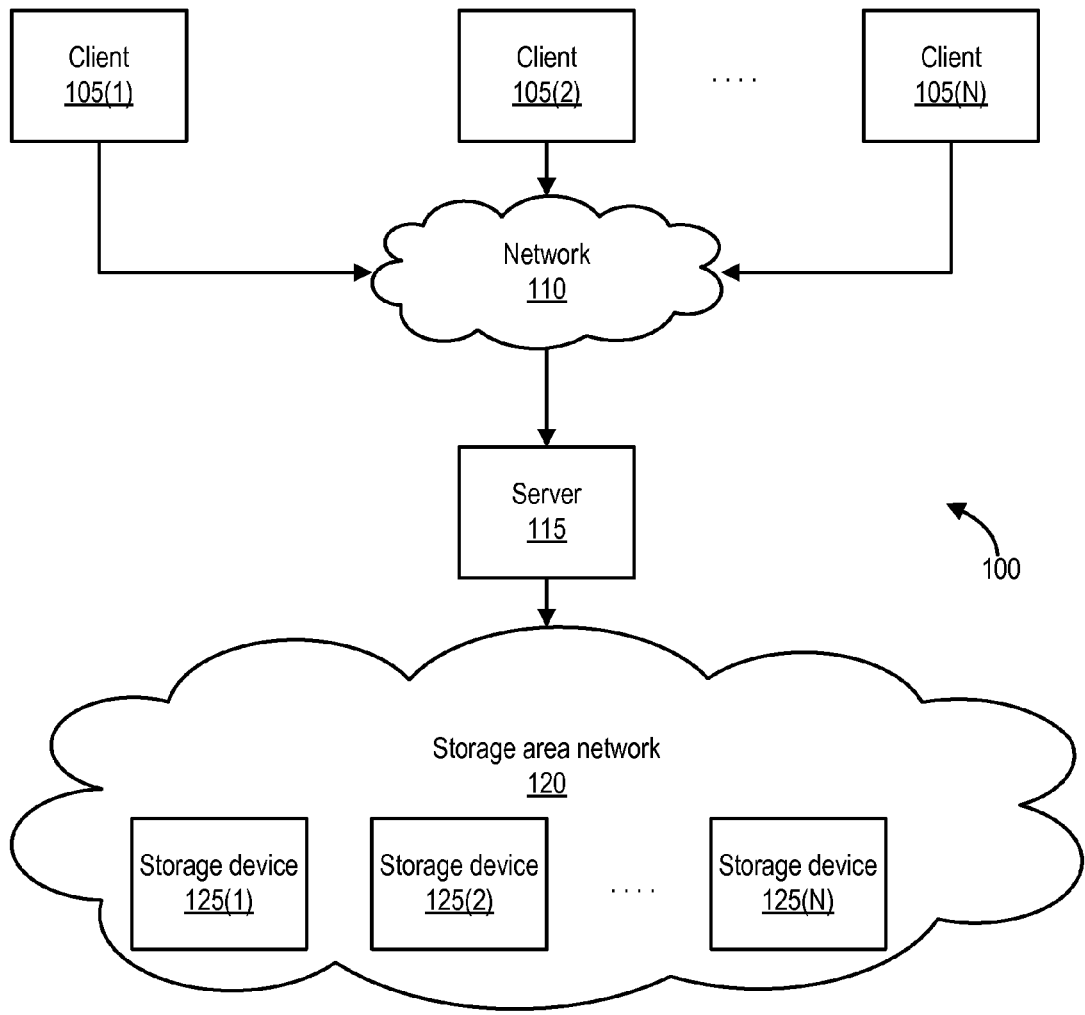
FIG. 1 is a simplified block diagram illustrating an example of a network architecture in which one or more clients have network access to a server, according to one embodiment of the invention.

FIG. 1 is a simplified block diagram illustrating a network architecture 100 in which one or more clients are provided with access to a server via various network connections. As depicted in FIG. 1, clients 105(1)-105(N) are coupled to a network 110, and so are able to access a server 115 via network 110. A client can be implemented using, for example, a desktop computer, a laptop computer, a workstation, a server, a cellular telephone, a smart telephone, a network-enabled personal digital assistant, or the like. An example of network 110, which can be used by clients 105(1)-105(N) to access server 115, is the Internet. Alternatively, access to server 115 can be provided by a local area network (LAN) using Ethernet, IEEE 802.11x, or some other communications protocol. As will be appreciated, server 115 can be accessed by clients coupled directly thereto (not shown). The clients can even be implemented on the same machine as server 115 (also not shown).

As also depicted in FIG. 1, server 115 is coupled to a storage area network (SAN) 120. SAN 120 includes a collection of storage devices 125(1)-125(N). A storage area network such as SAN 120 couples remote storage devices to a server (e.g., server 115), such that the remote storage devices appear as locally-attached storage devices to the server's operating system, for example.

In light of the present disclosure, storage devices 125(1)-125(N) can be implemented by any type of storage device including, but not limited to internal or external hard drives (HDD), optical drives (e.g., CD-R, CD-RW, DVD-R, DVD-RW and the like), flash memory drives (e.g., USB memory sticks, and the like), tape drives, and the like. Alternatively, storage devices 125(1)-125(N) can be directly coupled to server 115 (not shown). According to one embodiment of the present invention, storage devices 125(1)-125(N) can also be implemented as logical volumes and/or devices. Also, at least some of storage devices 125(1)-125(N) are implemented as deduplication storage devices, volumes, and or data stores. A deduplication storage device, volume, and/or data store is a storage device and/or volume that stores a piece of information (which can include a file or a block of data) only one time. For example, during a first backup operation, if a set of data to be backed up includes multiple copes of a particular file (or even a particular block of data), only one copy of the particular file (or block of data) will be stored in the deduplication storage device and/or volume. Similarly, if the set of data includes data that has not changed between the time of the first backup operation and a subsequent backup operation, the data has not changed will not be duplicated in storage as long as a copy of that data continues to be stored in the deduplication storage device, volume and/or data store.

According to some embodiments of the present invention, at least some of storage devices 125(1)-125(N) can also be implemented as non-deduplication devices (also not shown).

Server 115 is implemented as a backup server, which coordinates backup procedures with clients 105(1)-105(N) by assigning a storage device 125(1)-125(N) to store sets of data to be backed up from clients 105(1)-105(N). As a non-limiting example, a single client (e.g., client 105(1)) initiates a backup procedure with a server (e.g., server 115). The server is coupled to two storage devices (e.g., storage device 125(1) and storage device 125(2)) via a SAN (e.g., SAN 120). By implementing the process described herein in greater detail in conjunction with FIGS. 2-5, the server selects between the two storage devices a single storage device to store the data associated with the backup procedure initiated by the single client.

Example network 100 may include other components such as routers, firewalls, and the like that are not germane to the discussion of the present network and will not be discussed further herein. According to an embodiment, other configurations are possible (e.g., clients directly coupled to a SAN without the use of a server, the use of Network Attached Storage (NAS) instead of a SAN, and the like).

Figure 2:
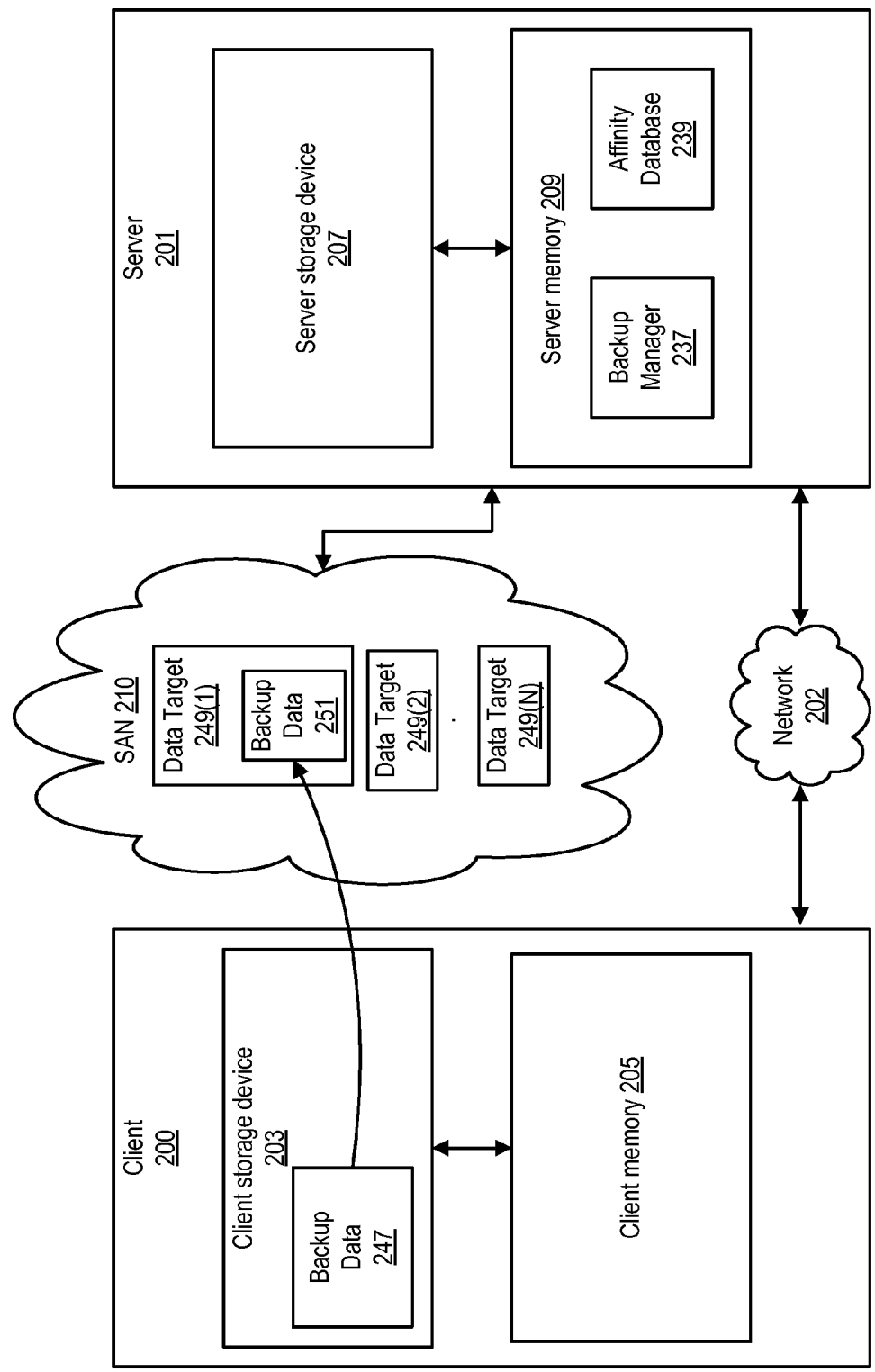
FIG. 2 is a simplified block diagram depicting an example relationship between a client, server, and storage area network, according to one embodiment of the invention.

FIG. 2 is a simplified block diagram that depicts an example relationship between a client and a server. As illustrated, a client 200 (which can be utilized to implement one of clients 105(1)-105(N) of FIG. 1) is coupled to server 201 (which can be utilized to implement server 115 of FIG. 1) via a network 202 (which can be utilized to implement network 110 of FIG. 1). Client 200 further includes a client storage device 203 and client memory 205. Server 201 further includes a server storage device 207 and a server memory 209. Server 201 is coupled to a SAN 210 (which can be utilized to implement SAN 120 of FIG. 1), which further includes a collection of data targets 249(1)-249(N) (which can be utilized to implement storage devices 125(1)-125(N) of FIG. 1). Data targets 249(1)-249(N) can be implemented as physical devices (e.g., any type of storage device including, but not limited to internal or external hard drives (HDD), optical drives (e.g., CD-R, CD-RW, DVD-R, DVD-RW and the like), flash memory drives (e.g., USB memory sticks and the like), tape drives, and the like) or logical data volumes stored upon a physical device. Also, according to an embodiment of the present invention, at least one of data targets 249(1)-249(N) is implemented by a deduplication data store.

Server memory 209 includes a backup manager 237 and an affinity database 239. Backup manager 237 controls and logs the details of backup operations between clients (e.g., client 200) and a server (e.g., server 201). According to one embodiment of the present invention, either the client or the server can initiate the backup operation. The backup operation accesses backup data (e.g., backup data 247) resident in client storage device 203 and creates a copy of that backup data. The copy of backup data (e.g., backup data 251) is stored on at least one data target 249(1)-249(N) in SAN 210. Affinity database 239, as discussed herein in greater detail in conjunction with FIG. 3, stores a collection of information that associates data sources (e.g., client 200 and the like) with data targets (e.g., data targets 249(1)-249(N)). According to one embodiment of the present invention, the server and/or client uses the information in affinity database 239 to select a data target for a data source for at least some backup operations.

FIG. 3 illustrates an example of an affinity database. According to embodiments of the present invention, affinity database 300 (which can be used to implement affinity database 239) can be implemented as a database table. Other embodiments of the present invention can implement affinity database 300 as a spreadsheet, table, comma separated values (CSV) file, and the like. Affinity database 300 stores entries (e.g., entry 301) that establish a prior association between a data source and a data target. The association is formed after the data source backs up a set of backup data to a particular data target. The entries indicate an increased likelihood that at least some information stored on the data source is already being stored on the data target prior to performing the backup operation. The entries in affinity database 300 also include multiple fields that store information to describe the details of such an association (such an association is hereinafter referred to as an "affinity relationship"). Such fields include, but are not limited to: a client identifier field 302, a backup policy field 304, a backup schedule field 306, a backup type field 308, a data target field 310, and operating system type field 312, and an affinity value field 314, all of which are discussed herein in greater detail. The backup manager can populate some or all of the entry fields when describing the association between a data source and a data target, as discussed herein in greater detail.

Client identifier field 302 identifies a client (e.g., client 200 of FIG. 2) that forms the first part of the affinity relationship between a client and the data target. Backup policy field 304 identifies a time period (e.g., daily, weekly, monthly, and the like) in which a backup procedure is executed. Backup schedule field 306 indicates a day and/or time, if necessary, that the backup procedure is executed. A backup type field 308 indicates whether the backup operation is an incremental or full backup operation. According to one embodiment of the present invention, a backup operation is a full backup operation when a complete copy of a data set stored on the data source is made and transferred to a data target coupled to a server. On the other hand, an incremental backup operation results in transferring to a data target only the data in the data set that has changed since a previous backup.

Returning to FIG. 3, a data target field 308 identifies a data target that forms the second part of the affinity relationship between the client and data target. Also, the identified data target also stores a backup data set from the client identified in client identifier field 302. Operating system field 312 indicates a type of operating system used by the client identified in client identifier field 302. For example, the client can be implementing a Microsoft® Windows® (e.g. Windows® XP®, Windows® Vista®, and the like), Linux®, Mac® OS X® or any other type of operating system. Also, an affinity value field 314 stores affinity values that measure a degree of affinity between a client and a specified data target.

According to some embodiments of the present invention, the affinity value can be expressed as a "scalar value." A "scalar value" measures a magnitude of a quality. For example, "40 miles per hour" is a scalar measurement of speed. The affinity value measures the magnitude of the affinity relationship between a data source and a data target. According to one embodiment of the present invention, one way to determine the magnitude of the affinity relationship between a data source and a data target is to first measure the total amount of backup data stored on the data target. The amount of backup data stored on the data target that represents backup data from the data source is then determined by the server. The affinity value is proportional to the quotient of (1) the amount of backup data from the data source, and (2) the total amount of backup data stored on the data target. As the proportion of backup data from the data source to the total amount of backup data stored on the data target increases, the affinity value also increases. Likewise, as the proportion of backup data from the data source to the total amount of backup data stored on the data target decreases, the affinity value decreases. Also, according to an embodiment of the present invention, the affinity value can be proportional to the absolute amount of backup data from the data source that is stored on the data target. As the absolute amount increases, the affinity value increases proportionally. As the absolute amount decreases, the affinity value decreases proportionally. The increase and/or decrease of the affinity value is controlled by the backup manager (e.g., backup manager 237 of FIG. 2).

For example, during a first backup procedure, a client (i.e., data source) sends 3 GB of data to a data target for backup. Then, during a second backup procedure, the client sends an additional 4.8 GB of data to the data target for backup. The backup manager (e.g., backup manager 237 of FIG. 2) increases the affinity value, which indicates a greater magnitude of affinity between the data source and the data target.

Some embodiments of the present invention institute a data retention policy for retaining backup data sets for a predetermined amount of time. Once that predetermined amount of time expires, the older backup sets are retired. In some embodiments of the present invention, the older backup data sets are retired by deleting the older backup data sets from the data target and discarding or archiving those older backup data sets. Of course, the older backup data sets are backup data sets from various data sources. Those data sources have an association with the data target that stores the older backup data sets. As previously discussed, details of the association between the data source and the data target are stored within affinity database 239, which includes affinity value field 314. Once the backup manager removes the older backup data sets according to the data retention policy, the backup manager decreases the affinity values associated with the older backup sets. The reduction of the affinity values represent a reduction of the magnitude of the affinity relationship between the data sources associated with the older backup sets and their respective data targets.

According to an embodiment of the present invention, upon receiving a request to start a backup operation from a data source (e.g., a client), the backup manager accesses the affinity database to determine if an affinity relationship exists between the data source and a data target. The backup manager's determination if an affinity relationship exists between the data source and data target can be accomplished in a variety of ways.

According to one embodiment of the present invention, the backup manager can examine the "client identifier field" of the entries within the affinity database to determine if any of the entries in the affinity database identify a data source that matches the data source requesting the start of the backup operation. If an entry (e.g., entry 301) containing information associating the data source and a data target exists in the affinity database, the backup manager determines that an affinity relationship exists between the data source and a data target.

According to another embodiment of the present invention, the backup manager can implement a priority system for determining if an affinity relationship exists. A system administrator can define the priority system depending on network conditions. For example, the backup manager can first check for an entry that indicates a matching data source. If an entry with a matching data source does not exist, the backup manager can search for an entry within affinity database for an entry with a matching operating system, which includes a prior backup operation that was executed with a data source that utilized a matching operating system. The affinity relationship between the data source and the data target is further defined by the type of backup operation requested (e.g., incremental, full). Therefore, a system administrator can prioritize backup operations by the type of backup operation. The system administrator can dictate, for example, that all incremental backups have priority over full backups at certain hours of the day (e.g., peak business hours) due to the resource-intensive nature of performing a full backup.

If, however, a matching entry does not exist in the affinity database, other methods such as round-robin, least-recently-used, and/or available-space-per-disk-volume assignments can be used to match the requesting data source with a data target. A "round-robin" assignment of data targets is a method of load distribution among a group of data targets. The backup manager assigns the group of data targets to incoming backup procedures in a way that each data target gets a first assignment before a particular data target receives a second assignment. For example, if there is a group of three data targets, the backup manager assigns the first data target to a first backup procedure, a second data target to a second backup procedure, and a third data target to a third backup procedure. Since all of the data targets have been assigned to one backup procedure, the backup manager would assign the first data target to a fourth backup procedure. In a "round-robin" assignment, none of the data targets have a higher priority than any other data target. Each data target is assigned an equal portion of the incoming backup procedures, and in order. A "least-recently-used (LRU)" assignment is similar to a "round-robin" assignment. In an LRU assignment of data targets, the backup manager also assigns an equal portion of the incoming backup procedures to all of the data targets. The backup manager assigns the "least-recently-assigned" data target to the next incoming backup procedure. An "available-space-per-disk-volume" assignment results in the backup manager determining the data target with the most available space remaining and assigning that data target to the next incoming backup procedure.

Once the backup operation is complete, if there is no pre-existing affinity relationship between the data source and the data target, the backup manager creates a new entry in the affinity database defining the details of the completed backup operation. The backup manager can populate some or all of the entry fields when describing the association between a data source and a data target. In other words, the backup manager notes the identification of the data source, the backup policy for the backup procedure, backup schedule for the backup procedure, backup type for the backup procedure, the identification of the data target, the operating system type of the data source, and generates an affinity value proportional to the amount of backup data transferred by the data source to the data target. The backup manager then populates some or all of the fields in the affinity database to generate the new entry.

Also, once the backup operation is complete, if there is a pre-existing affinity relationship between the data source and the data target (indicated by a matching entry in the affinity database), the backup manager can modify the fields in the existing entry to update the entry with information pertaining to the completed backup operation. According to one embodiment, backup operations do not necessarily have to be initiated by a data source, but can be initiated by the server (via the backup manager or otherwise) or other data sources.

Figure 4:
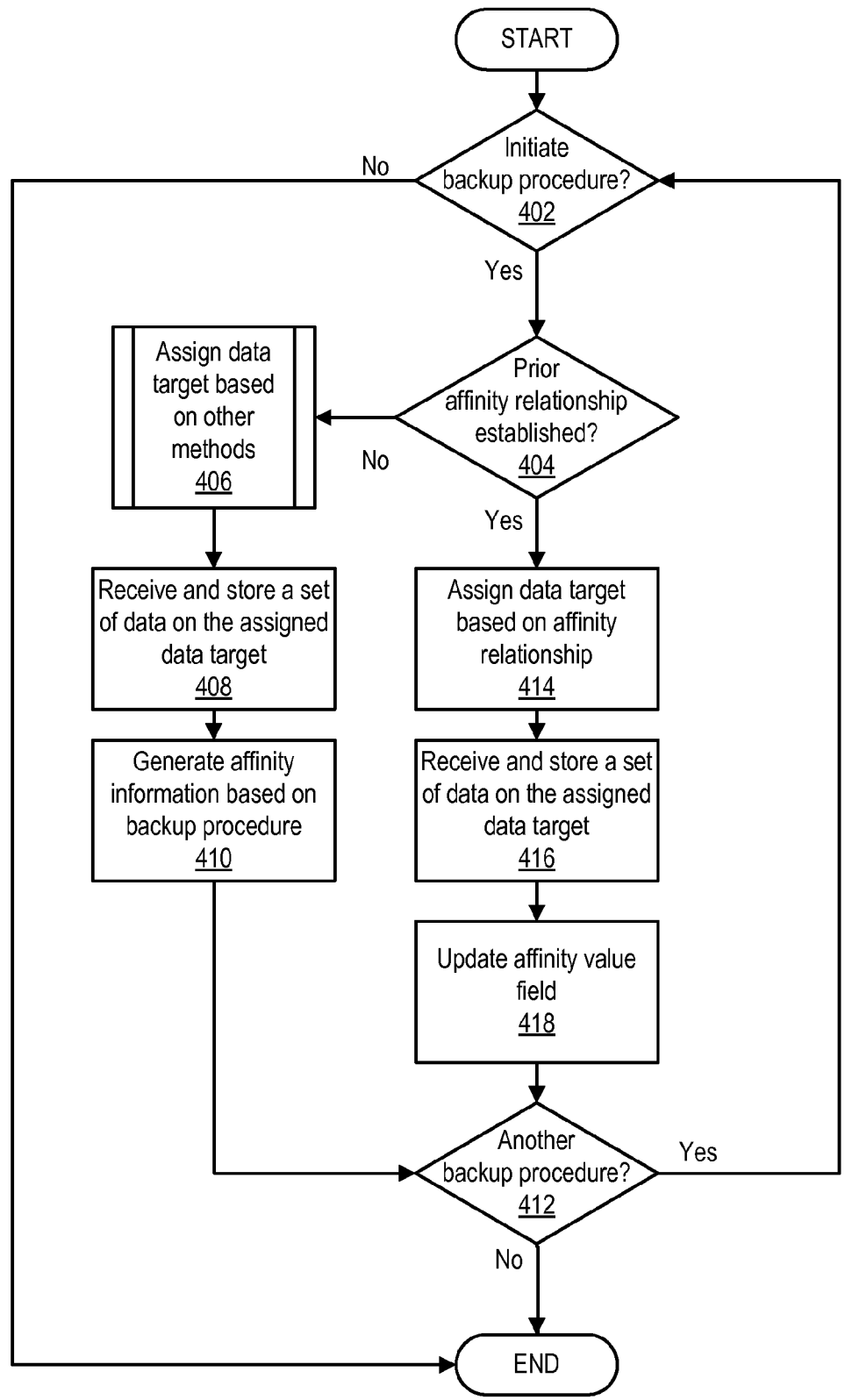
FIG. 4 is a simplified flow diagram depicting an example affinity-based allocation carried out by the server, according to one embodiment of the invention.

FIG. 4 is a simplified flow diagram depicting an example affinity-based allocation carried out by the server. The process begins with a backup manager (e.g., backup manager 237 of FIG. 2) receiving a request from a client (e.g., client 200 of FIG. 2) to initiate a backup procedure (operation 402). As previously discussed, the present invention does not require that a client initiates a backup procedure, but that the backup procedure can be initiated by the server (via the backup manager or otherwise) or by other clients. If a backup procedure has been initiated, the backup manager determines if a prior affinity relationship has been established between a data source (e.g., a client) associated with the backup procedure and a data target (e.g., a storage device 125(1)-125(N) or data targets 249(1)-249(N)) (operation 404).

As previously discussed, to determine if a prior affinity relationship has been established by the data source, the backup manager accesses an affinity database (e.g., affinity database 239) to determine if information associating a data source with a data target exists within the affinity database. For example, the backup manager can examine the client identifier fields (e.g., client identifier field 302) to determine if the client has an affinity relationship with any of the data targets coupled to the server. If a client identifier field (e.g., client identifier field 302 of FIG. 3) of an entry (e.g., entry 301) matches the client initiating the backup procedure, the backup manager determines that an affinity relationship exists between the client and a data target. By matching merely one field (client identifier field 302) with the client that is initiating the backup procedure, the backup manager determines that an affinity relationship exists between the client and a data target. As previously discussed, the backup manager can use other fields within the entries (e.g., operating system, type of backup operation, and the like) for the determination even if the client identifier field of any of the entries do not match the client initiating the backup procedure.

According to other embodiments of the present invention, a system administrator can require that the client and the data target to have a stronger affinity relationship than just the mere matching of the client identifier field and the data target fields. The backup manager can examine the affinity value fields (e.g., affinity value field 314) to determine the magnitude of the affinity, the backup type field (e.g., backup type field) 308 to determine the type of backup required (e.g., full or incremental), or any scheduling information in the backup policy field, backup schedule field, and the backup type field (e.g., backup policy field 304, backup schedule field 306, and backup type field 308). If the affinity relationship does not meet a certain threshold (e.g., does not have a high enough number of field matches and/or affinity value), the backup manager can characterize the backup operation as not having an affinity relationship, and the process continues to operation 406.

If a prior affinity relationship does not exist between the data source and a data target, the backup manager assigns a data target to the data source using other methods, such as round-robin, least-recently-used, and/or available-space-per-disk-volume algorithms (operation 406). The backup manager then receives a set of data from the data source and stores that data set on the assigned data target (operation 408). The backup manager generates affinity information based on the backup procedure and stores the affinity information in the affinity database (operation 410). According to an embodiment of the present invention, the backup manager notes the identification of the data source, the backup policy for the backup procedure, backup schedule for the backup procedure, backup type for the backup procedure, the identification of the data target, the operating system type of the data source, and generates an affinity value based proportional to the amount of backup data transferred by the data source to the data target. The backup manager then populates some or all of the fields in the affinity database to generate the new entry. The backup manager determines if another backup procedure is to be initiated (operation 412). If so, the process returns to operation 402. If not, the process ends.

Returning to operation 404, if a prior affinity relationship has been established, the backup manager assigns a data target to the data source based on the affinity information stored in the affinity database (operation 414). For example, the backup manager identifies the data target stored in the data target field and assigns that particular data target to the data source for the backup procedure. According to one embodiment of the present invention, the assignment of the data target to the data source is not a permanent assignment, but only for the current backup procedure. The assignment occurs when the backup manager designates the data target as the recipient of the backup data set to be sent by the data source during the backup procedure.

Also, according to other embodiments of the present invention, a system administrator or other user can override the backup manager's assignment of a data target to the data source at any time and manually assign a particular data target to the data source. If there is a pre-existing affinity relationship, the manual assignment (by the system administrator by sending a set of classification criteria representing an affinity relationship, e.g., creating an entry in the affinity database that identifies the data target designated by the system administrator) of a particular data target overrides the pre-existing affinity relationship.

According to one embodiment of the present invention, the backup manager makes a determination if the assigned data target is available. A data target can become unavailable for a variety of reasons, including, but not limited to, being offline due to data target or network failure. The data target could also be unavailable due to high demands on the data target's resources. For example, if multiple data sources are concurrently backing up their data on the same data target, the data target can be unable to fulfill another backup operation. In this case, the system administrator can force the backup manager to assign another data target based on round-robin, least-recently-used, available-space-per-disk-volume assignment. If the backup manager is forced to assign another data target, the process proceeds to operation 406 as if the backup manager had determined that a prior affinity relationship had not been established.

The backup manager then receives a set of data from the data source and stores that data set on the assigned data target (operation 416). The backup manager then updates the affinity value field (e.g., affinity value field 314 of FIG. 3) in the affinity information associated with the data source and data target (operation 418). According to an embodiment of the present invention, the affinity value in the affinity value field increases as the size of the data stored on the data target increases. On the other hand, the affinity value decreases based on the size of data deleted from a data target. For example, the storing of a data set increases the size of data stored on the data target. Thus, the affinity value would be increased by the backup manager and stored in the affinity value field of the corresponding entry.

The backup manager determines if another backup procedure is to be initiated (operation 412). If another backup procedure is to be initiated, the process returns to operation 402. If there are no other backup procedures to be initiated, the process ends. Returning to operation 402, if no backup procedure is to be initiated, the process ends.

An Example Computing Environment

Elements of network architecture 100 can be implemented using a variety of computer systems and networks. An example of one such computing environment is described below with reference to FIG. 5.

Figure 5:
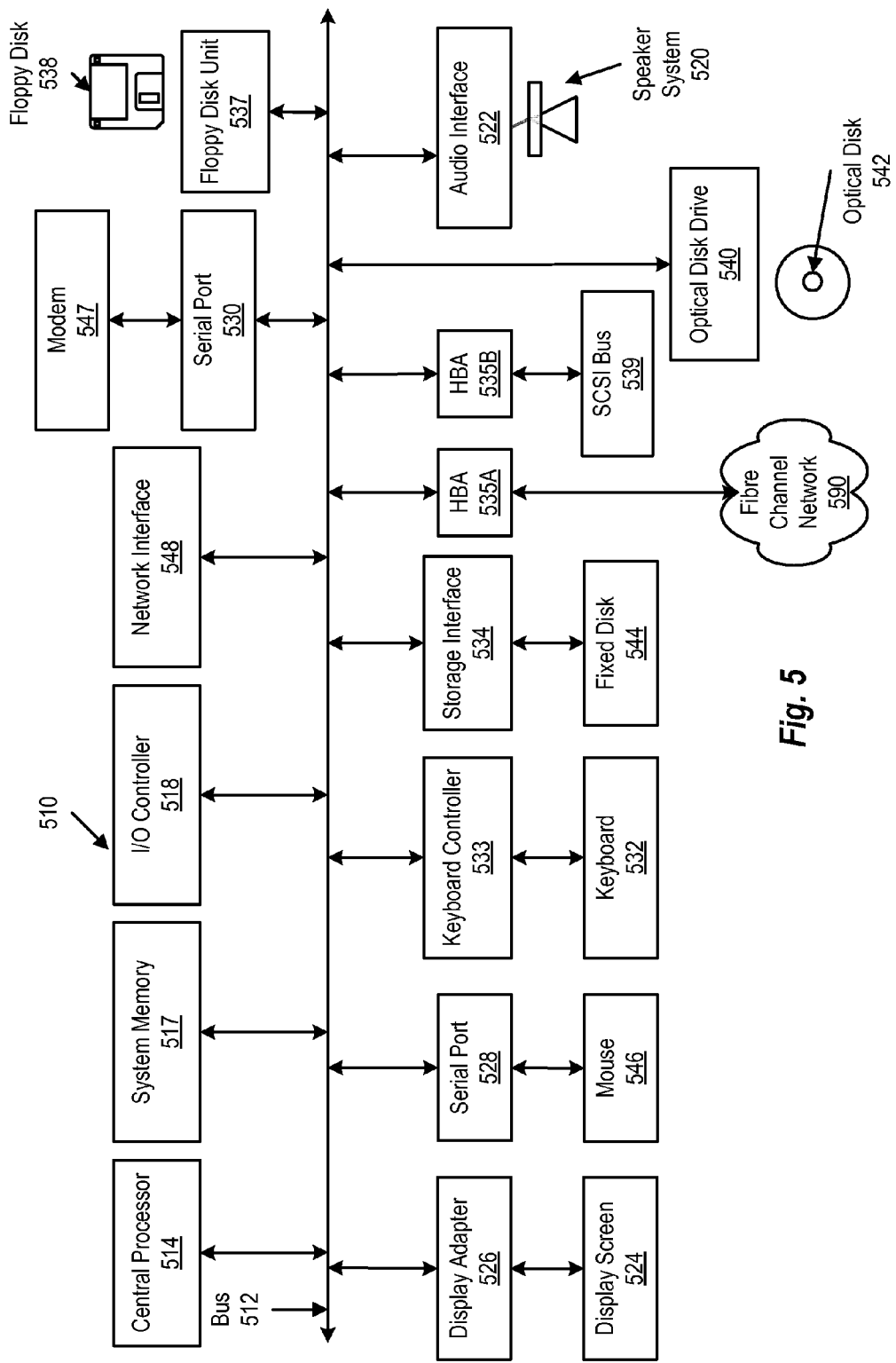
FIG. 5 is a simplified block diagram that illustrates an example of a computer system suitable for implementing embodiments of the present invention.

FIG. 5 depicts a block diagram of a computer system 510 suitable for implementing a server (e.g., server 115 of FIG. 1 and server 201 of FIG. 2), as well as clients (e.g., clients 105(1)-105(N) of FIG. 1 and client 200 of FIG. 2) used herein. Computer system 510 includes a bus 512, which interconnects major subsystems of computer system 510, such as a central processor 514, a system memory 517 (typically random-access memory (RAM), but which may also include read-only memory (ROM), flash ROM, or the like), an input/output controller 518, an external audio device, such as speaker system 520 via an audio output interface 522, an external device, such as a display screen 524 via display adapter 526, serial ports 528 and 530, a keyboard 532 (interfaced with keyboard controller 533), a storage interface 534, a floppy disk drive 537 operative to receive a floppy disk 538, a host bus adapter (HBA) interface card 535A operative to connect with a Fibre Channel network 590, a host bust adapter (HBA) interface card 535B operative to connect to a SCSI bus 539, and an optical disk drive 540 operative to receive an optical disk 542. Central processor 514 can execute instructions stored on a computer-readable medium such as system memory 517, floppy disk 538, optical disk 542, or a hard disk drive (e.g., fixed disk 544), and the like, to implement a method as described in FIG. 4. Also, backup manager 237 and affinity database 239 (both of FIG. 2) can be stored within the aforementioned computer-readable medium and coordinate the assignment of data targets to data sources as described in conjunction with FIGS. 2-4, via execution of instructions by central processor 514.

Also included are a mouse 546 (or other point-and-click device, coupled to bus 512 via serial port 528), a modem 547 (coupled to bus 512 via serial port 530), and a network interface 548 (coupled directly to bus 512). Bus 512 allows data communication between central processor 514 and system memory 517, which may include read-only memory (ROM) or flash memory (neither shown) and random access memory (RAM) (not shown), as previously noted. RAM is generally the main memory into which operating system and application programs are loaded. ROM or flash memory can contain, among other code, the Basic Input-Output system (BIOS) which controls basic hardware operation such as the interaction with peripheral components. Applications resident with computer system 510 are generally stored on and accessed via a computer-readable medium, such as hard disk drive (e.g., fixed disk 544), an optical drive (e.g., optical drive 540), a floppy disk unit 537, or other storage medium.

Storage interface 534, as with other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a point-of-presence (POP). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 5 need not be present. The devices and subsystems can be interconnected in different ways from that shown in FIG. 5. The operation of the computer system such as that shown in FIG. 5 is readily known in the art and is not discussed in detail in this application. Code to implement the previously-described features can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or other known operating system.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
in response to identifying initiation of a backup of a data source, accessing an affinity database to determine whether an affinity relationship has been established between the data source and a first data target of a plurality of data targets, wherein
the first data target is a deduplication data store, and
the affinity relationship indicates a likelihood that at least some information stored on the data source is already being stored on the first data target prior to performing the backup of the data source;
in response to determining that the affinity relationship has been established, assigning the first data target to the data source to complete the backup; and
performing the backup of the data source to the first data target, wherein
the performing the backup copies a set of data stored on the data source to the first data target.

2. The method of claim 1, wherein the affinity database does not contain any information associating a second data source with any of the plurality of data targets, and further comprising:
selecting a second data target of the plurality of data targets;
storing a second set of data generated by the second data source on the second data target; and
generating information associating the second data source with the second data target.

3. The method of claim 1, wherein the affinity relationship further comprises:
a set of one or more classification criteria; and
a numerical value representing a strength of association between the data source and the first data target.

4. The method of claim 3, wherein the set of classification criteria further comprises:
information identifying a client associated with the data source;
information identifying a backup policy associated with the data source;
information identifying a backup schedule associated with the data source; and
information identifying a type of backup associated with the data source.

5. The method of claim 3, wherein the set of classification criteria further comprises:
information identifying the first data target.

6. The method of claim 3, wherein the set of classification criteria further comprises:
information identifying an operating system associated with the data source.

7. The method of claim 3, further comprising:
receiving information indicating the set of one or more classification criteria from a system administrator; and
storing the set of one or more classification criteria.

8. The method of claim 3, further comprising:
incrementing the numerical value based on a size of the set of data stored on the data source; and
decrementing the numerical value based on a size of an image deleted from the data source.

9. The method of claim 1, further comprising:
in response to determining that the first data target cannot be accessed, selecting a third data target of the plurality of data targets;
storing the set of data on the third data target; and
generating information associating the data source with the third data target.

10. A system comprising:
one or more processors; and
a memory coupled to the one or more processors, wherein the memory stores program instructions executable by the one or more processors to:
access an affinity database, to determine whether an affinity relationship has been established between a data source and a first data target of the plurality of data targets, in response to identifying initiation of a backup of the data source, wherein
the first data target is a deduplication data store, and
the affinity relationship indicates a likelihood that at least some information stored on the data source is already being stored on the first data target prior to performing the backup of the data source;
assign the first data target to the data source to complete the backup, in response to determining that the affinity relationship has been established; and
perform the backup of the data source to the first data target, wherein
the backup copies a set of data stored on the data source to the first data target.

11. A computer program product comprising:
a plurality of instructions, comprising
a first set of instructions, executable on a computer system, to access an affinity database, to determine whether an affinity relationship has been established between a data source and a first data target of a plurality of data targets, in response to identifying initiation of a backup of the data source, wherein the first data target is a deduplication data store, and
the affinity relationship indicates a likelihood that at least some information stored on the data source is already being stored on the first data target prior to performing the backup of the data source;
a second set of instructions, executable on the computer system, to assign the first data target to the data source to complete the backup, in response to determining that the affinity relationship has been established; and
a third set of instructions, executable on the computer system, to perform the backup of the data source to the first data target, wherein the backup copies a set of data from the data source to the first data target; and
non-transitory computer readable storage media, wherein the instructions are encoded in the non-transitory computer readable storage media.

12. The computer program product of claim 11, wherein the affinity database does not contain any information associating a second data source with any of the plurality of data targets, and the instructions further comprise:
a fourth set of instructions, executable on the computer system, to select a second data target of the plurality of data targets;
a fifth set of instructions, executable on the computer system, to store a second set of data generated by the second data source on the second data target; and
a sixth set of instructions, executable on the computer system, to generate information associating the second data source and the second data target.

13. The computer program product of claim 11, wherein the affinity database further comprises:
a set of one or more classification criteria; and
a numerical value representing a strength of association between the data source and the first data target.

14. The computer program product of claim 13, wherein the set of classification criteria further comprises:

information identifying a client associated with the data source;
information identifying a backup policy associated with the data source;
information identifying a backup schedule associated with the data source; and
information identifying a type of backup associated with the data source.

15. The computer program product of claim 13, wherein the set of classification criteria further comprises:
information identifying the first data target.

16. The computer program product of claim 13, wherein the set of classification criteria further comprises:
information identifying an operating system associated with the data source.

17. The computer program product of claim 13, wherein the instructions further comprise:
a seventh set of instructions, executable on the computer system, to receive information indicating the set of one or more classification criteria from a system administrator; and
an eighth set of instructions, executable on the computer system, to store the set of one or more classification criteria.

18. The computer program product of claim 13, wherein the instructions further comprise:
a ninth set of instructions, executable on the computer system, to increment the numerical value based on a size of the set of data stored on the data source; and
a tenth set of instructions, executable on the computer system, to decrement the numerical value based on a size of an image deleted from the data source.

19. The computer program product of claim 11, wherein the instructions further comprise:
an eleventh set of instructions, executable on the computer system, to select a third data target of the plurality of data targets, in response to determining that the first data target cannot be accessed;
a twelfth set of instructions, executable on the computer system, to store the set of data on the third data target; and
a thirteenth set of instructions, executable on the computer system, to generate information associating the data source and the third data target.

* * * * *